Aug. 20, 1957  B. J. GOLBECK  2,803,153
ADJUSTABLE SAW AND PLANER
Filed July 27, 1956  2 Sheets-Sheet 1

INVENTOR:
BERNARD J. GOLBECK
BY Marshall, Johnston,
Cook & Root
ATT'YS

Aug. 20, 1957  B. J. GOLBECK  2,803,153
ADJUSTABLE SAW AND PLANER
Filed July 27, 1956  2 Sheets-Sheet 2
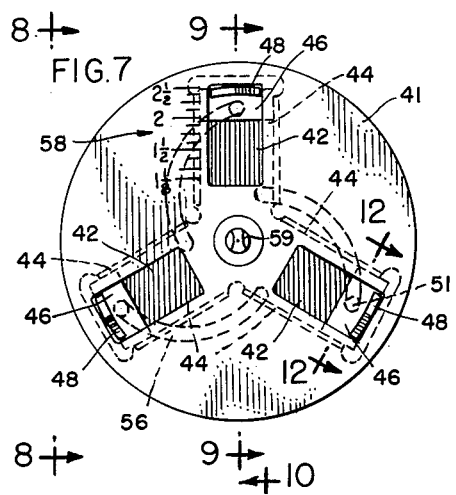
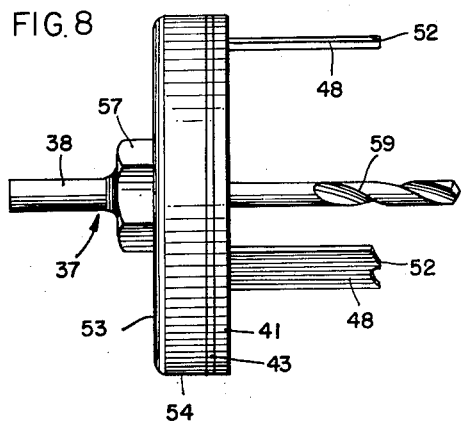
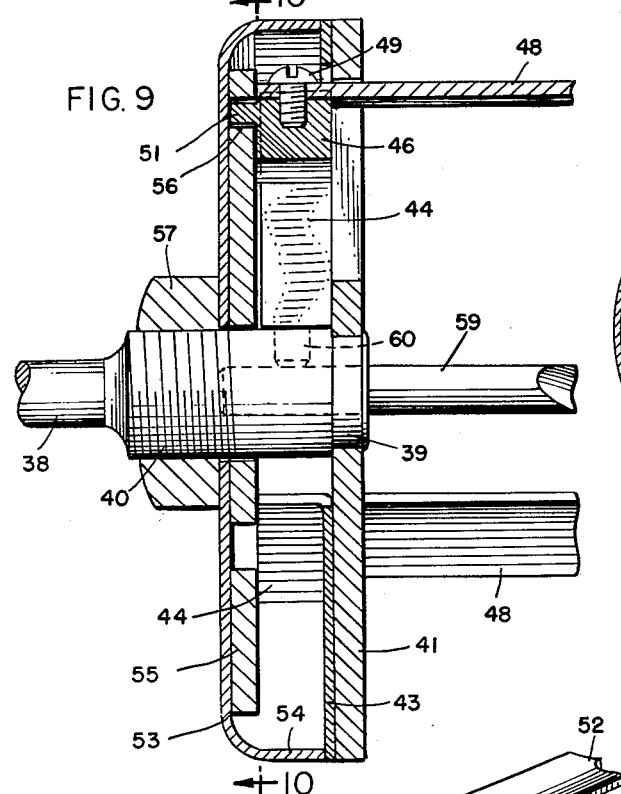
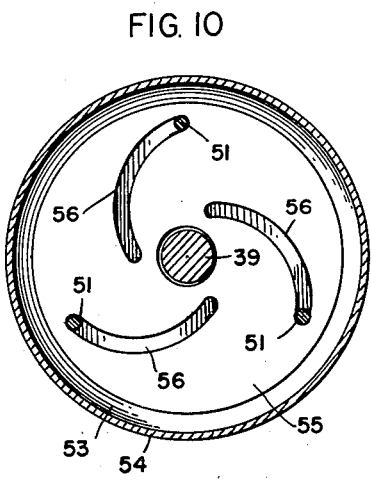
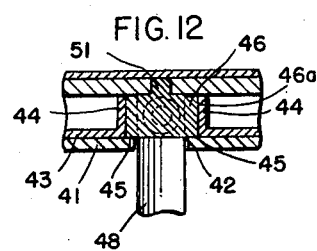
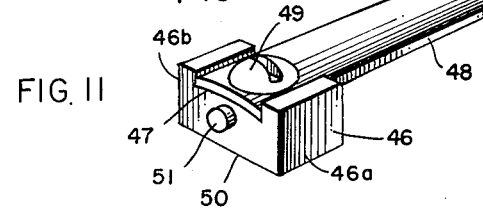
INVENTOR:
BERNARD J. GOLBECK
BY Marzall Johnston,
Cook & Root
ATT'YS United States Patent Office 2,803,153
Patented Aug. 20, 1957

2,803,153
ADJUSTABLE SAW AND PLANER

Bernard J. Golbeck, Crystal Lake, Ill., assignor to Erwood, Inc., Chicago, Ill., a corporation of Illinois Application July 27, 1956, Serial No. 600,454

7 Claims. (Cl. 77—69)

The present invention relates generally to a combination saw and planer, but more particularly to a simplified and easily adjustable cutting tool which is adapted to be mounted on any type of machine which will impart rotary motion thereto for performing a multiplicity of operations, and is a continuation-in-part of my copending application filed September 17, 1953, bearing Serial No. 380,689, now abandoned.

One of the primary objects of the present invention is to provide a simple, compact cutting tool in which a plurality of different types of cutting blades may be adjustably secured therein for cutting holes, washers, circular plugs or discs, and gaskets or the like from various types of metal, wood, plastic or similar materials. The tool is also adaptable for supporting therein cutting blades for cutting grooves or tongues in longitudinal strips of wood or other material such as plastic and the like.

Another object of the invention is to provide a novel and improved construction of a simplified rotary tool in which a plurality of cutting blades are mounted therein and can be simultaneously adjusted and secured in their adjusted position by a simple single clamping means.

A further object of the invention is to provide a novel and improved adjustable saw having simultaneously adjustable cutting blades mounted therein and a graduated scale associated therewith so that the diameter of the hole to be cut by the saw may be accurately set on the tool.

These and other objects are accomplished by providing a construction and an arrangement of the various parts in the manner hereinafter described and particularly pointed out in the appended claims.

Referring to the drawings:

Fig. 7 is a bottom plan view of a modified form of a cutting tool embodying the present invention;

Fig. 8 is a side elevational view of the tool taken along the plane of line 8—8 of Fig. 7;

Fig. 9 is a fragmentary enlarged vertical sectional view taken along the plane of line 9—9 of Fig. 7;

Fig. 10 is a sectional view taken along the plane of line 10—10 of Fig. 9;

Fig. 11 is a perspective view of a modified form of one of the adjustable blocks and cutting blades, and Fig. 12 is a fragmentary sectional view taken along the plane of line 12—12 of Fig. 7.

Figure 1:
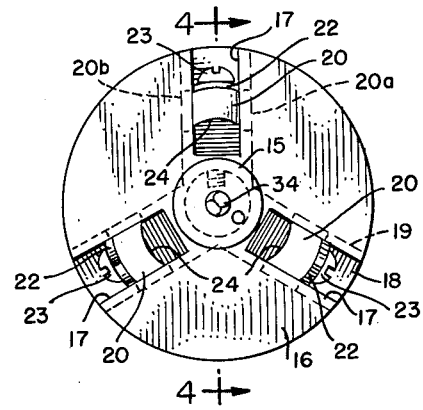
Fig. 1 is a bottom plan view of my improved tool.
Figure 2:
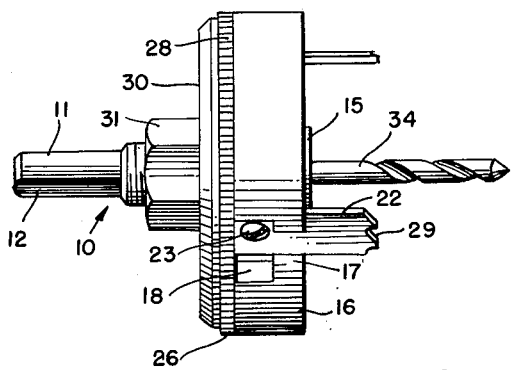
Fig. 2 is a side elevational view of the same.
Figure 3:
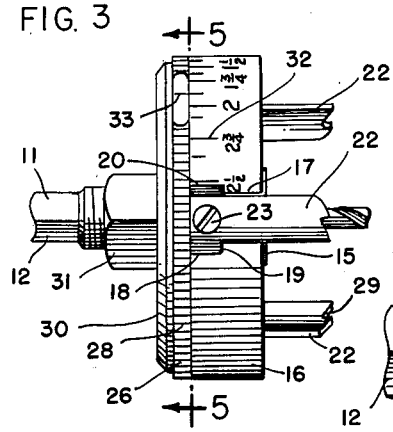
Fig. 3 is a fragmentary side elevational view showing the graduation scale thereon.
Figure 4:
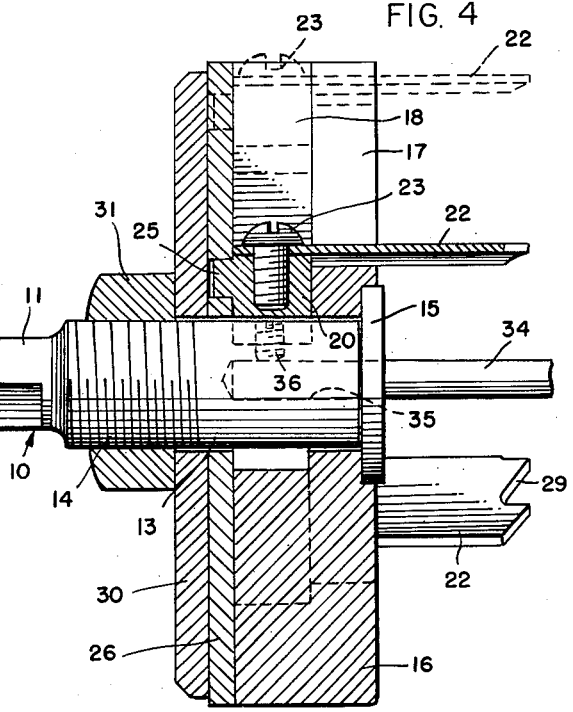
Fig. 4 is an enlarged cross-sectional view taken on the line 4—4 in Fig. 1.
Figure 5:
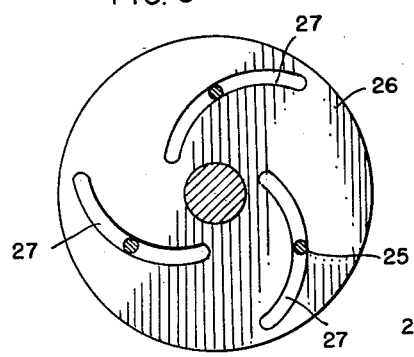
Fig. 5 is a cross-sectional view taken on the line 5—5 in Fig. 3.

One form of the invention is illustrated in Figs. 1 to 6 inclusive where there is shown the tool of the present invention as comprising a shank member generally indicated by the numeral 10 which has a portion 11 of reduced diameter and a flat side 12 for securing the tool in a drill press, lathe, electric hand drill, milling machine, or any other type of machine which will impart a rotary motion thereto.

The lower portion of the shank 10 has an enlarged diameter as shown at 13, the upper part of which is provided with external threads 14. The lower end of the shank 11 is provided with an enlarged disc-like head 15. A supporting disc 16 is rigidly secured to the enlarged portion 13 of the shank and to the head 15. The disc 16 is provided with a plurality of T-shaped slots which extend radially outwardly from the shank portion 13 and are equally spaced apart. The vertical leg of each T-shaped slot is shown at 17 while the horizontal portion thereof is shown at 18. There are thus provided the oppositely disposed flat shoulders 19 for the reception of a cutting tool slidable longitudinally thereof. Each cutting tool consists of a supporting block 20 having an arcuate recess 21 in one side thereof adapted to receive a cutter or saw blade 22. Each cutter or saw blade 22 depends downwardly from the supporting block 20 on which it is mounted by means such as a screw 23. Each block is also provided on its inner surface with an arcuate recess 24 adapted to contact the large cylindrical portion 13 of the shank 10 when the cutting blades are adjusted to their innermost position.

Figure 6:
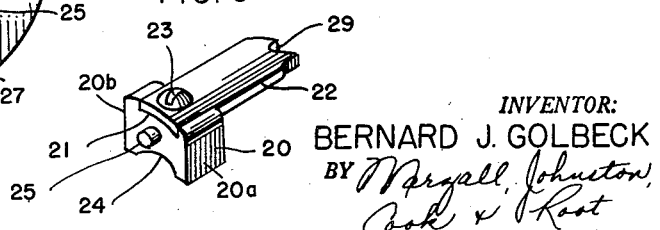
Fig. 6 is a perspective view of one of the adjustable blocks and cutting blades.

Each supporting block 20 is mounted for sliding movement in the upper horizontal portion 18 of a T-slot so that the cutting blade 22 thereof will extend downwardly through and beyond the vertical leg 17. As illustrated in Figures 1 and 6, each supporting or mounting block 20 has opposite sides 20a and 20b paralleling the sides of the upper portion 18 of the radial T-slot. This construction restricts the movement of the mounting blocks 20 to linear movement in the slots, longitudinally thereof, precluding axial play or rotation of the blocks and cutting blades 22. The cutting blades and the blocks on which they are mounted are adjusted longitudinally of the radial slots and are adapted to be locked in any adjusted position so that all of the cutting members will be positioned at equal distances from the center of the disc 16 during use thereof. A lug 25 also projects upwardly from each of the blocks 20 for a purpose which will be described more fully hereinafter.

A cam disc 26 is loosely mounted on the enlarged portion 13 of the shank 10 and is provided with eccentrically arranged arcuate cam slots 27. One cam slot is provided for each of the cutting elements and blocks 20 so that in the illustrated form of the invention, there being three such cutting elements, there will be three cam slots 27. These cam slots are symmetrically arranged with respect to the axial center of the disc 26 and are adapted to receive the upwardly projecting lugs 25 on the supporting blocks 20. The cam disc 26 is adapted to be rotated and for this purpose the periphery thereof may, if desired, be serrated as shown at 28 to facilitate the gripping and the adjustment of the disc in its rotational movement.

It will thus far be clear that when the cam disc 26 is rotated in either direction, the eccentrically arranged slots 27 therein will slide all of the supporting blocks 20 simultaneously lengthwise of the radial T-slots by reason of the lugs 25 received by such slots. Since the supporting blocks 20 carry the cutting blades 22, these blades will likewise be adjusted or moved simultaneously in a radial direction, thereby to vary the diameter for radial spacing of the cutting blades for cutting holes of different sizes.

Each cutting blade is provided with saw teeth 29 and is transversely arcuate as shown, thereby to facilitate the cutting action of the saw teeth and to more accurately regulate the diameter of the hole being cut.

A clamping disc 30 is mounted on top of the cam disc 26 and also embraces the enlarged portion 13 of the shank. The thickness of each supporting block 20 is slightly greater than the height of the horizontal portion 18 of the T-slots so that when the nut 31 engaging the threads 14 is tightened downwardly against the clamping disc 30, all of the cutting elements will be held in their adjusted position and the cam disc 26 is held against rotation.

The supporting disc 16 is provided with a graduated scale, as indicated at 32, on one portion of its periphery adjacent the cam disc 26. A line marker 33 on the periphery of cam disc 26 is adapted to be brought into alignment with the various indicia 32 as the cam disc is rotated, whereupon the cutting blades are adjusted to various diameters as indicated on the scale for cutting holes of the indicated diameter.

The tool itself is guided by a drill 34 which has its shank received in a bore 35 extending axially of the enlarged portion 13 of the shank 10. The drill 34 is retained in position by a threaded set screw 36 received in a threaded hole extending radially of the shank, as more clearly shown in Fig. 4.

It will be evident, therefore, that all of the transversely arcuate cutting blades containing the saw teeth 29 thereon may be adjusted simultaneously to different diameters merely by loosening the nut 31 and rotating the cam disc 26. Should the operator desire to use the tool as a planer, the drill 34 may be removed and the material moved longitudinally beneath the saw blades, whereupon the top surface of the material will be removed in the same manner as a plane.

Referring now more particularly to Figs. 7 to 12 inclusive, there is shown a modified form of tool embodying the same principle of operation and adjustment but having a specifically different construction. In these figures the shank is indicated generally by the numeral 37 and is provided with a portion 38 of lesser diameter for reception in a drill, lathe or other suitable mechanism for imparting rotation thereto. The lower end of the shank 37 has a portion 39 of enlarged diameter, the upper part of which is externally threaded as shown at 40. A supporting disc 41 is rigidly secured to the lower end of the shank around the enlarged portion 39 thereof and is provided with a plurality of radially extending slots 42. A relatively thin disc 43 is welded or otherwise securely fastened to the upper surface of the supporting disc 41 and is provided with a plurality of pairs of upwardly extending and parallel ears 44. These ears 44 are also parallel with and closely adjacent to the longidutinal edges of the slots 42 in the disc 41.

As may be more clearly seen in Fig. 12, the space between the ears 44 of each pair is somewhat greater than the width of the slots 42, thereby resulting in a composite slot of T-formation provided with shoulders 45 for supporting the individual cutting tools.

The cutting element assembly is similar to that heretofore described and includes a block 46 having an arcuate recess 47 on one side thereof for the reception of a transversely arcuate cutting element or saw blade 48. The cutting element is retained on the block 46 by a screw 49. The inner surface 50 of the block 46 is shown in Fig. 11 as being flat rather than of arcuate formation like that shown in Fig. 6. Whether this surface is flat or arcuate, however, is a matter of design choice and the blocks may be formed in either fashion. A lug 51 extends upwardly from the top surface of the block 46 for a purpose which will be presently described.

A cutting element, as illustrated in Fig. 11, wherein the blade has the saw teeth 52 on its lower end, is received in each of the radial slots 42 so that the blade 48 thereof extends downwardly through the slot while the block 46 rests upon the shoulders 45 and is guided in its radial adjusting movement by the ears 44. The mounting block 46 has opposite sides 46a and 46b paralleling the ears 44, to restrict the blocks to linear longitudinal movement between the ears, as described for the embodiment of Figure 1. It will be noted that the slots 42 are closed at both ends in this modified form of the invention, whereas the slots 17 in the supporting disc 16 are open at the periphery of the disc.

A cap member 53 is provided with a skirt portion 54 around its periphery and is adapted to be placed over the enlarged portion 39 of the shank 37 so that the lower edges of the skirt 54 will abut the upper surface of the thin disc 43. Thus, the upper side of the cap 53 will be maintained in spaced relation to the disc 43 and is loosely mounted on the shank so that it may be freely rotated for adjustment purposes. A cam disc 55 is welded or otherwise securely fixed to the underside of the cap 53 and is provided with a plurality of cam slots 56.

When the cutting elements are all in place in the slots 42 and the cap 53 is applied thereto, the lugs 51 will be received by the cam slots 56 so that when the cap is rotated, all of the cutting elements will move inwardly or outwardly in radial direction simultaneously.

A clamping nut 57 threadedly engages the threads 40 on the enlarged portion 39 of the shank 37 and is adapted to be tightened against the cap 53, thereby to retain and lock the individual cutting elements in any position to which they may have been adjusted.

Suitable indicia in the form of a scale 58 is applied to the under surface of the supporting disc 41 and is located along one side of one of the radial slots 42 so that the diameter of the hole being cut by the cutting elements may be determined and adjusted.

As in the case of the first described form of the invention, the tool is guided by a drill 59 received within a central bore of the enlarged portion 39 of the shank 37 and held in place by a set screw 60. Thus, when a planing operation is desired, the drill 59 may be removed and the tool operated as previously described herein.

It will be evident that saw blades of different number and having a different number of teeth than shown herein may be utilized for performing different operations on different types of material such as metal, wood or plastic. The construction of both forms of the invention has the further advantage that the individual cutting elements 24 or 48 may be removed and replaced on their respective supporting blocks by different types of cutting elements for performing different operations. For example, laterally or angularly projecting saw blades may be secured on the blocks for cutting tongues or grooves in longitudinal strips of material.

Changes may be made in the form, construction and arrangement of parts from those disclosed herein without in any way departing from the spirit of the invention or sacrificing any of the attendant advantages thereof, provided, however, that such changes fall within the scope of the claims appended hereto.

The invention is hereby claimed as follows:

1. A cutting tool comprising a shank, a disc secured to one end of said shank and having a plurality of radially extending T-slots therein, a mounting block in each of said radial slots slidable longitudinally on the shoulders of said slots and having opposite sides paralleling the sides of said radial slots for solely linear movement therein, a cutting blade secured to each of said mounting blocks and projecting through the leg of the corresponding slot beyond the plane of said disc, a second disc rotatably mounted on said shank on the side of said first disc opposite to that from which said blades project, a plurality of eccentric cam slots in said second disc, a lug on each of said mounting blocks extending into a cam slot in said second disc, whereby rotation of said second disc will move said mounting blocks and the cutting blades secured thereto simultaneously in a radial direction in said radial slots for adjustment purposes, and clamping means on said shank engageable with said second disc to clamp said discs together and retain said mounting blocks and cutting blades in adjusted position.

2. A cutting tool comprising a shank, a disc secured to one end of said shank and having a plurality of radially extending T-slots therein, a mounting block in each of said radial slots slidable longitudinally on the shoulders of said slots and having opposite sides paralleling the sides of said radial slots for solely linear movement therein, a cutting blade removably secured to each of said mounting blocks and projecting through the leg of the corresponding slot beyond the plane of said disc, a drill removably secured to said shank axially thereof for rotation therewith and projecting beyond said cutting blades, a second disc rotatably mounted on said shank on the side of said first disc opposite to that from which said blades project, a plurality of eccentric cam slots in said second disc, a lug on each of said mounting blocks extending into a cam slot in said second disc, whereby rotation of said second disc will move said mounting blocks and the cutting blades secured thereto simultaneously in a radial direction in said radial slots for adjustment purposes, and clamping means on said shank engageable with said second disc to clamp said discs together and retain said mounting blocks and cutting blades in adjusted position.

3. A cutting tool comprising a shank, a disc secured to one end of said shank and having a plurality of radially extending T-slots therein, a mounting block in each of said radial slots slidable longitudinally on the shoulders of said slots and having opposite sides paralleling the sides of said radial slots for solely linear movement therein, said mounting blocks extending in height beyond said disc, a cutting blade secured to each of said mounting blocks and projecting through the leg of the corresponding slot beyond the plane of said disc, a second disc rotatably mounted on said shank on the side of said first disc opposite to that from which said blades project, a plurality of eccentric cam slots in said second disc, a lug on each of said mounting blocks extending into a cam slot in said second disc, whereby rotation of said second disc will move said mounting blocks and the cutting blades secured thereto simultaneously in a radial direction in said radial slots for adjustment purposes, and clamping means on said shank engageable with said second disc to clamp said mounting blocks between said discs and retain said mounting blocks and cutting blades in adjusted position.

4. A cutting tool comprising a shank, a disc secured to one end of said shank and having a plurality of radially extending T-slots therein, a mounting block in each of said radial slots slidable longitudinally on the shoulders of said slots and having opposite sides paralleling the sides of said radial slots for solely linear movement therein, a cutting blade secured to each of said mounting blocks and projecting through the leg of the corresponding slot beyond the plane of said disc, a second disc rotatably mounted on said shank on the side of said first disc opposite to that from which said blades project, a plurality of eccentric cam slots in said second disc and extending therethrough, a lug on each of said mounting blocks extending into a cam slot in said second disc, whereby rotation of said second disc will move said mounting blocks and the cutting blades secured thereto simultaneously in a radial direction in said radial slots for adjustment purposes, a third disc on said shank on the opposite side of said second disc from said first disc, and a nut threadedly engaging said shank and adapted to be brought against said third disc to clamp all of said discs together and retain said mounting blocks and cutting blades in adjusted position.

5. A cutting tool comprising a shank, a disc secured to one end of said shank and having a plurality of radially extending T-slots therein, a mounting block in each of said radial slots slidable longitudinally on the shoulders of said slots and having opposite sides paralleling the sides of said radial slots for solely linear movement therein said mounting blocks extending in height beyond said disc, a transversely arcuate cutting blade removably secured to each of said mounting blocks and projecting through the leg of the corresponding slot beyond the plane of said disc, a plurality of saw teeth on the outer end of each said cutting blade, a drill removably secured to said shank axially thereof for rotation therewith and projecting beyond said cutting blades, a second disc rotatably mounted on said shank on the side of said first disc opposite to that from which said blades project, a plurality of eccentric cam slots in said second disc and extending therethrough, a lug on each of said mounting blocks extending into a cam slot in said second disc, whereby rotation of said second disc will move said mounting blocks and the cutting blades secured thereto simultaneously in a radial direction in said radial slots for adjustment purposes, a third disc on said shank on the opposite side of said second disc from said first disc, and a nut threadedly engaging said shank and adapted to be brought against said third disc to clamp all of said discs together and retain said mounting blocks and cutting blades in adjusted position.

6. A cutting tool as defined in claim 1 wherein said cutting blades are removably secured to said mounting blocks, and said radial slots are open at their outer ends.

7. A cutting tool comprising a shank, a disc secured to one end of said shank and having a plurality of radially extending T-slots therein, a mounting block in each of said radial slots slidable longitudinally on the shoulders of said slots and having opposite sides paralleling the sides of said radial slots for solely linear movement therein, a cutting blade removably secured to each of said mounting blocks and projecting through the leg of the corresponding slot beyond the plane of said disc, a cap member rotatably mounted on said shank on the side of said disc opposite to that from which said blades project, said cap member having a peripheral skirt enclosing the assembly of said mounting blocks in said radial slots, a plurality of eccentric cam slots on the inner surface of said cap member, a lug on each of said mounting blocks extending into a cam slot on said cap member, whereby rotation of said cap member will move said mounting blocks and the cutting blades secured thereto simultaneously in a radial direction in said radial slots for adjustment purposes, and clamping means on said shank engageable with said cap member to clamp said cap member and said disc together and retain said mounting blocks and cutting blades in adjusted position.

References Cited in the file of this patent
UNITED STATES PATENTS

| | | |
|---|---|---|
| 703,538 | Cartwright | July 1, 1902 |
| 1,870,350 | Van Norman | Aug. 9, 1932 |
| 2,371,708 | Rial | Mar. 20, 1945 |

FOREIGN PATENTS

| | | |
|---|---|---|
| 228,653 | Great Britain | Feb. 12, 1925 |